United States Patent [19]

Hilmoe

[11] 4,167,381
[45] Sep. 11, 1979

[54] CENTRIFUGAL CASTING EQUIPMENT HAVING AN INTERCHANGEABLE

[76] Inventor: Lawrence J. Hilmoe, 9419 Caddy La., Caledonia, Wis. 53108

[21] Appl. No.: 839,171

[22] Filed: Oct. 4, 1977

[51] Int. Cl.² ............................................. B29C 5/04
[52] U.S. Cl. ................................. 425/182; 264/311; 425/425; 425/434; 164/289
[58] Field of Search ...................... 425/182, 425, 434; 164/289, 290; 264/311; 403/262

[56] References Cited

U.S. PATENT DOCUMENTS

| 2,618,031 | 11/1952 | Mazer | 164/290 |
| 3,505,437 | 4/1970 | Eichmann et al. | 264/311 |
| 4,058,155 | 11/1977 | Eash | 164/289 |

FOREIGN PATENT DOCUMENTS 688571  3/1953  United Kingdom ..................... 164/290

Primary Examiner—Richard B. Lazarus
Assistant Examiner—John McQuade
Attorney, Agent, or Firm—Andrus, Sceales, Starke & Sawall

[57] ABSTRACT

A centrifugal casting machine has an interchangeable casting head to permit the head to be rapdily and easily changed from one mold size to another. The head is removably affixed to the upper end of the motor driven shaft of the machine as by bolting to a flange on the shaft.

9 Claims, 4 Drawing Figures

CENTRIFUGAL CASTING EQUIPMENT HAVING AN INTERCHANGEABLE

BACKGROUND OF THE INVENTION—FIELD OF THE INVENTION

The present invention is directed to centrifugal casting equipment having an interchangeable head.

BACKGROUND OF THE INVENTION—DESCRIPTION OF THE PRIOR ART

Centrifugal casting techniques rotate the molds containing the casting cavities. The cavities are displaced from the axis of rotation so as to rotate about the axis. The centrifugal forces generated by this rotation drives the casting material into the cavities.

A typical casting system of this type employs molds comprised of two disc of silicone or organic rubber. Models of the items to be molded are placed between the mold discs. The mold discs are then placed in a vulcanizing machine. Pressure and heat are applied to the molds to vulcanize the rubber and form it around the patterns.

After curing, the molds are separated and the patterns removed. Runners are cut from a central sprue of the molds to the edge of each cavity.

The molds are then reassembled and locked on the rotatable head of centrifugal casting maching. The head is mounted on a shaft driven by a motor. After the head has begun spinning, the casting material, such as precatalyzed resin or low temperature metal alloy, is poured in the central sprue of the molds. The casting material is thrown into the mold cavities by the centrifugal force where it solidifies. The mold halves are then separated and the casting removed.

Because of their economy and flexibility, casting systems of the foregoing type possess a high degree of utility in casting a wide variety of different sized articles and in short casting runs. To efficiently accommodate the variety of different sized articles, the heads and molds are available of series of sizes, for example, 12", 15", and 18" in diameter.

In the past, the head and shaft have been formed as an integral unit. As a result, it has not been possible to change the head of a machine to go, for example, from a 12" diameter head to a 15" diameter head without a major and time-consuming teardown of the casting machine. This has tended to detract from the advantages of the centrifugal casting machine in accommodating a variety of different sized articles and the short run. The other possibility is for the caster to purchase several casting machines, each with the different sized head but this is a costly alternative.

SUMMARY OF THE PRESENT INVENTION

It is, therefor, the object of the present invention to provide a centrifugal casting machine in which the head may be rapidly and easily changed from one size to another, thereby to enhance the versatility and flexibility of such a machine.

In the present invention a collar is provided on the upper end of the shaft. A flange extends above the collar co-axial with the shaft. The head has a hole in the center so that the head may be placed over the flange to rest on the collar. Faster means, such as bolts pass through the head into the collar to secure the head to the shaft. A key is placed in mating keyways on the collar and head for resisting torsional forces arising between the shaft and the head. One of the keyways may comprise a notch terminating in the head or collar to retain the key in the keyways.

The head of the centrifugal casting machine may be changed by loosening the bolts, lifting the old head off the collar, placing a new head on the collar, inserting the key, and tightening the bolts.

The head of the casting machine may contain molds of the type described above or may contain a lost wax casting arm.

DETAILED DESCRIPTION OF THE PREFERRED EMBODIMENT

Figure 1:
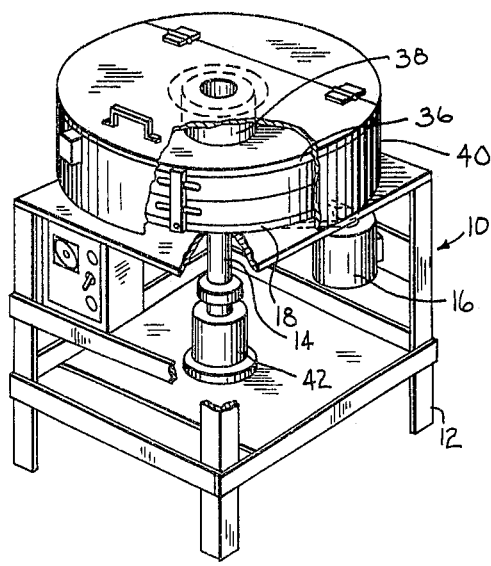
FIG. 1 is a general perspective view of a centrifugal casting machine of the type to which the present invention relates.

There is shown in FIG. 1 a centrifugal casting machine 10. The machine includes a frame 12 which supports the machine on the floor. The machine also includes a shaft 14 journalled in frame 12. Shaft 14 is driven by motor 16 for rotation about a vertical axis.

Figure 2:
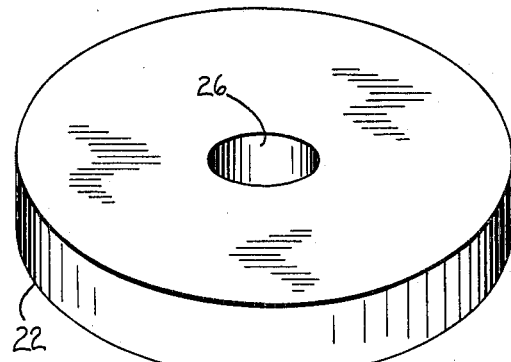
FIG. 2 is an exploded perspective view of the head portion of a centrifugal casting machine constructed in accordance with the present invention.

As shown in FIG. 2, head 18 is mounted on the upper end of shaft 14, in a manner hereinafter described, to receive on its exposed surface 19, lower mold 20 and upper mold 22. Molds 20 and 22 are typically formed of silicone or organic rubber, but may be formed of other suitable material including metal. Molds 20 and 22 contain the mold cavities in which the castings are formed. One such cavity 24 is exemplarily shown in FIG. 2. Upper mold 22 contains central sprue 26 through which the casting material is received in the molds. Lower mold 20 contains depression 28 at the lower end of sprue 26 and runner 30 connecting the sprue with cavity 24. Projections 32 on lower mold 20 mate with corresponding depressions on upper mold 22 for orienting the molds with respect to each other. A clamping means 34 is provided for clamping the molds together with central sprue 26 aligned with the axis of shaft 14. The means may include an upper plate 36 containing funnel 38 for the casting material. Protective shroud 40 surrounds the rotating parts of casting machine 10.

In operation, molds 20 and 22 are clamped between head 18 and plate 36 as by actuating air cylinder 42. Motor 16 is energized to rotate shaft 14, head 18 and plate 36 and molds 20 and 22. The casting material, such as molten metal or catalyzable resin, is poured through funnel 38 into sprue 26 and depression 28. The casting material is flung by the centrifugal forces in the rotating molds down runner 30 and into cavity 24 to fill the cavity and form the casting. When the casting material was hardened, motor 16 is deenergized. Upper plate 36 and molds 20 and 22 are removed from head 18 and separated along the parting line to remove the casting.

As noted in the introductory portions of the specification, in the past, head 18 and shaft 14 were formed as an integral unit. To change from a head of one size to a head of another size required major disassembly of machine 10, including pulling the old shaft out of the bearings and pressing a new one in, disconnecting and reconnecting air cylinder 42 and motor 16, etc.

The present invention overcomes this disadvantage to provide a head construction by which the head may be rapidly and easily removed and replaced to alter the head size of the machine. To this end, shaft 14 is provided with collar 50 at the upper end thereof. An anular flange 52 is provided on the upper surface of collar 50 co-axial with shaft 14 and, if desired, flange 52 may comprise an extension of shaft 14 with collar 50 being placed around the shaft.

Figure 3:
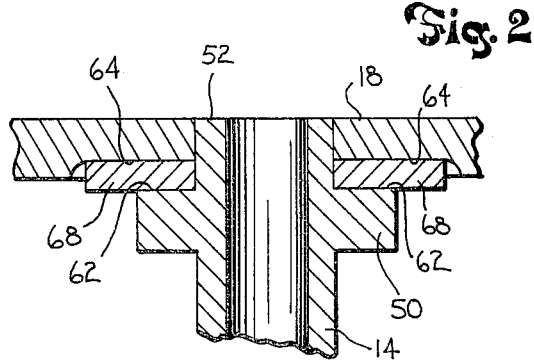
FIG. 3 is a fragmentary cross-sectional view taken along the line 3—3 FIG. 2.

Head 18 contains a centrally located hole corresponding in size with flange 52 so that head 18 may be placed on the upper surface of collar 50 with flange 52 positioned inside hole 54. The height of flange 52 corresponds to the thickness of plate 18 so that the top of collar 52 lies flat with the upper surface of head 18, as shown in FIG. 3.

Bolts 56 pass through holes 58 in head 18 and are received in threaded engagement with holes 60 to fasten head 18 to shaft 14.

To resist the torsional forces exerted between head 18 and shaft 14 during acceleration and driving, a keyway 62 is cut in the upper surface of collar 50 as shown in FIG. 2 and a corresponding keyway 64 is cut in the lower surface of head 18. Key 68 is placed in keyways 62 and 64 when the head is assembled on collar 50. Once the head is fastened on shaft 14, key 68 cannot escape because of the outer termination of keyway 64 as shown in FIG. 3. If desired, a plurality of keyways and keys may be utilized.

To interchange a head 18 of one size with a head 18 of another size, it is necessary only to loosen bolts 56, remove the old head, position the new head on collar 50, insert keys 68 and retighten bolts 56.

Figure 4:
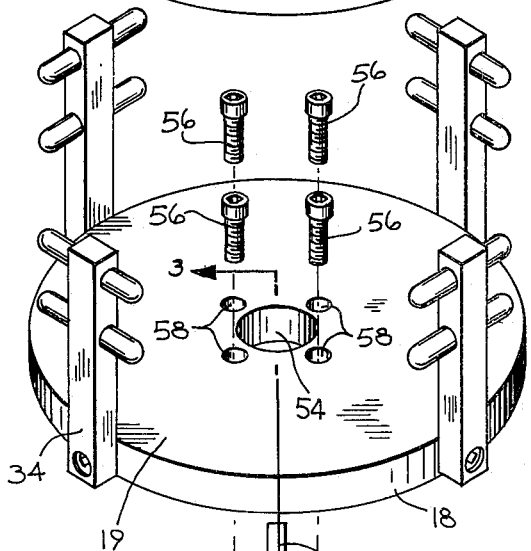
FIG. 4 is an exploded perspective view of another embodiment of the present invention.
Figure 4:
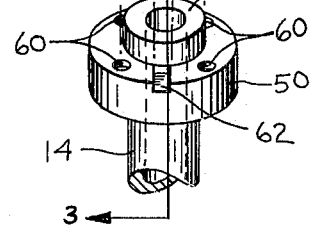

As shown in FIG. 4, head 18a may contain lost wax casting arm 70 instead of molds 20 and 22. Lost wax casting arm 70 includes support 72 mounted on head 18a, on which is mounted arm 74. One end of arm 74 contains crucible 76, in which the casting material is placed and flask 78 containing the mold. Crucible 76 and flask 78 may be pivotally mounted on arm 74 to improve the centrifugal action. Head 18a may be constructed in the same general manner as head 18 to mate with collar 50 and flange 52 and to include holes 58 for bolts 56.

Various modes of carrying out the invention are contemplated as being within the scope of the following claims particularly pointing out and distinctly claiming the subject matter which is regarded as the invention.

I claim:

1. In a centrifugal casting machine having a generally vertical shaft mounted in a frame, rotary drive means coupled to said shaft for rotating same, and head for receiving a casting mold mounted on said shaft along the axis thereof for being rotated by said shaft, the improvement comprising:
    a collar on the upper end of said shaft having a flange extending thereabove co-axial with said shaft;
    said head having an opening in the central portion thereof for receiving said flange when said head is placed on said shaft so that said head abuts said collar;
    fastener means for fixing said head to said collar; and
    a key received in said collar and head and extending therebetween for preventing relative rotation between said collar and head.

2. The improvement according to claim 1 including opposing keyways in said collar and head for receiving said key.

3. The improvement according to claim 2 wherein said key is elongated in one dimension and wherein said key and keyways are so oriented that said key extends radially away from the axis of rotation of said shaft in the direction of extension of said key.

4. The improvement according to claim 3 wherein one of said keyways is formed as a notch terminating in an end radially displaced from the axis of said shaft for retaining said one key in said keyway.

5. The improvement according to claim 4 wherein said keyway formed as said notch is located in said head.

6. The improvement according to claim 1 wherein said head includes a plate having an opening for receiving said flange.

7. The improvement according to claim 6 wherein the height of said flange equals the thickness of said plate.

8. The improvement according to claim 6 wherein said fastener means comprises bolts extending through said plate into said collar.

9. Th improvement according to claim 1 including a casting mold received on said head and mounted on a lost wax casting arm.

* * * * *